(12) United States Patent
Tobias

(10) Patent No.: US 10,353,997 B1
(45) Date of Patent: Jul. 16, 2019

(54) FREEFORM ANNOTATION TRANSCRIPTION

(71) Applicant: Amazon Technologies, Inc., Seattle, WA (US)

(72) Inventor: Samantha Tobias, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/948,751

(22) Filed: Apr. 9, 2018

(51) Int. Cl.
| G06F 17/00 | (2019.01) |
| G06F 17/24 | (2006.01) |
| G06F 17/21 | (2006.01) |
| G06K 9/22 | (2006.01) |
| G06K 9/20 | (2006.01) |
| G06K 9/00 | (2006.01) |

(52) U.S. Cl.
CPC .......... *G06F 17/241* (2013.01); *G06F 17/211* (2013.01); *G06F 17/242* (2013.01); *G06K 9/00402* (2013.01); *G06K 9/00463* (2013.01); *G06K 9/2054* (2013.01); *G06K 9/222* (2013.01); *G06K 2209/01* (2013.01)

(58) Field of Classification Search
CPC ............................ G06F 17/246; G06F 17/241
See application file for complete search history.

(56) References Cited

U.S. PATENT DOCUMENTS

| 6,330,976 | B1 * | 12/2001 | Dymetman | ......... | G06F 3/03545 235/487 |
| 7,148,898 | B1 * | 12/2006 | Howard | .................. | G06T 17/05 345/581 |
| 7,574,048 | B2 * | 8/2009 | Shilman | ............... | G06F 3/04883 345/156 |
| 2004/0205542 | A1 * | 10/2004 | Bargeron | .............. | G06F 17/241 715/201 |
| 2005/0091027 | A1 * | 4/2005 | Zaher | .................. | G06F 17/2229 703/22 |
| 2005/0183005 | A1 * | 8/2005 | Denoue | ................. | G06F 17/241 715/202 |
| 2005/0289452 | A1 * | 12/2005 | Kashi | .................. | G06F 17/2247 715/232 |
| 2006/0288842 | A1 * | 12/2006 | Sitrick | ................. | G09B 15/002 84/477 R |
| 2008/0068562 | A1 * | 3/2008 | Hirata | .................... | H04N 5/232 353/25 |
| 2009/0132907 | A1 * | 5/2009 | Shao | ................... | G06F 17/2247 715/234 |
| 2010/0011428 | A1 * | 1/2010 | Atwood | ................. | G06Q 20/40 726/7 |

(Continued)

*Primary Examiner* — Laurie A Ries
(74) *Attorney, Agent, or Firm* — Lee & Hayes, P.C.

(57) ABSTRACT

A freeform annotation in a print medium may be captured and converted to a digital annotation for association with a corresponding digital medium. The freeform annotations, which may be created by a human in the print medium, may be captured as an image by a camera. The image may be analyzed to determine a particular freeform annotation and associate the freeform annotation with text or objects in content of the print medium to create an anchor location for the freeform annotation. The location of the freeform annotation in the print medium may be mapped to a location in a corresponding digital medium. A digital version of the freeform annotation may be configured for display in the location of the corresponding digital medium.

20 Claims, 10 Drawing Sheets

(56) References Cited

U.S. PATENT DOCUMENTS

| | | | |
|---|---|---|---|
| 2011/0153633 A1* | 6/2011 | Napper | G06K 9/342 |
| | | | 707/758 |
| 2011/0265034 A1* | 10/2011 | Garin | G06F 3/0425 |
| | | | 715/810 |
| 2013/0024418 A1* | 1/2013 | Sitrick | G06Q 10/101 |
| | | | 707/608 |
| 2013/0198600 A1* | 8/2013 | Lockhart | G06F 17/241 |
| | | | 715/230 |
| 2014/0026025 A1* | 1/2014 | Smith | G06Q 10/101 |
| | | | 715/230 |
| 2014/0201682 A1* | 7/2014 | Lee | G06F 3/0481 |
| | | | 715/846 |
| 2014/0245123 A1* | 8/2014 | Pircher | G06F 17/241 |
| | | | 715/232 |
| 2015/0138385 A1* | 5/2015 | Kim | H04N 5/23216 |
| | | | 348/211.99 |
| 2015/0186351 A1* | 7/2015 | Hicks | G06F 17/241 |
| | | | 715/232 |
| 2016/0070686 A1* | 3/2016 | Yu | G06F 17/241 |
| | | | 715/230 |
| 2016/0070687 A1* | 3/2016 | Shigeta | G06F 17/241 |
| | | | 715/232 |
| 2016/0070688 A1* | 3/2016 | Yao | G06F 17/241 |
| | | | 715/232 |
| 2016/0259766 A1* | 9/2016 | Ivanov | G06F 17/241 |
| 2016/0267067 A1* | 9/2016 | Mays | G06F 16/00 |
| 2016/0338120 A1* | 11/2016 | Boyle | H04L 65/1069 |

* cited by examiner

FREEFORM ANNOTATION TRANSCRIPTION

BACKGROUND

Increasingly, books, magazines, and newspapers are consumed in electronic form. People view these print mediums on a myriad of devices, including electronic reading (or "e-reading") devices, smart phones, tablet computers, and other electronic devices, as well on their physical "in print" counterparts. Often, a person is able to have electronic copies of a same print medium on multiple devices belonging to the person, removing the need to carry a single device to varying locations. Some people may have a physical copy of a print medium that corresponds to their electronic copies. For example, a person may have bought a physical copy of a book and, subsequently, purchased an electronic version of that book.

Many electronic devices communicate information between one another, such as positional changes in a book, annotations, and other information. However, the same ease of communication does not necessarily exist between print medium and digital medium. Further, many people often leverage notes and highlight annotations when interacting with their digital medium. However, these tools are restrictive and do not allow people to express all the same ideas as freeform annotations made in print medium.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
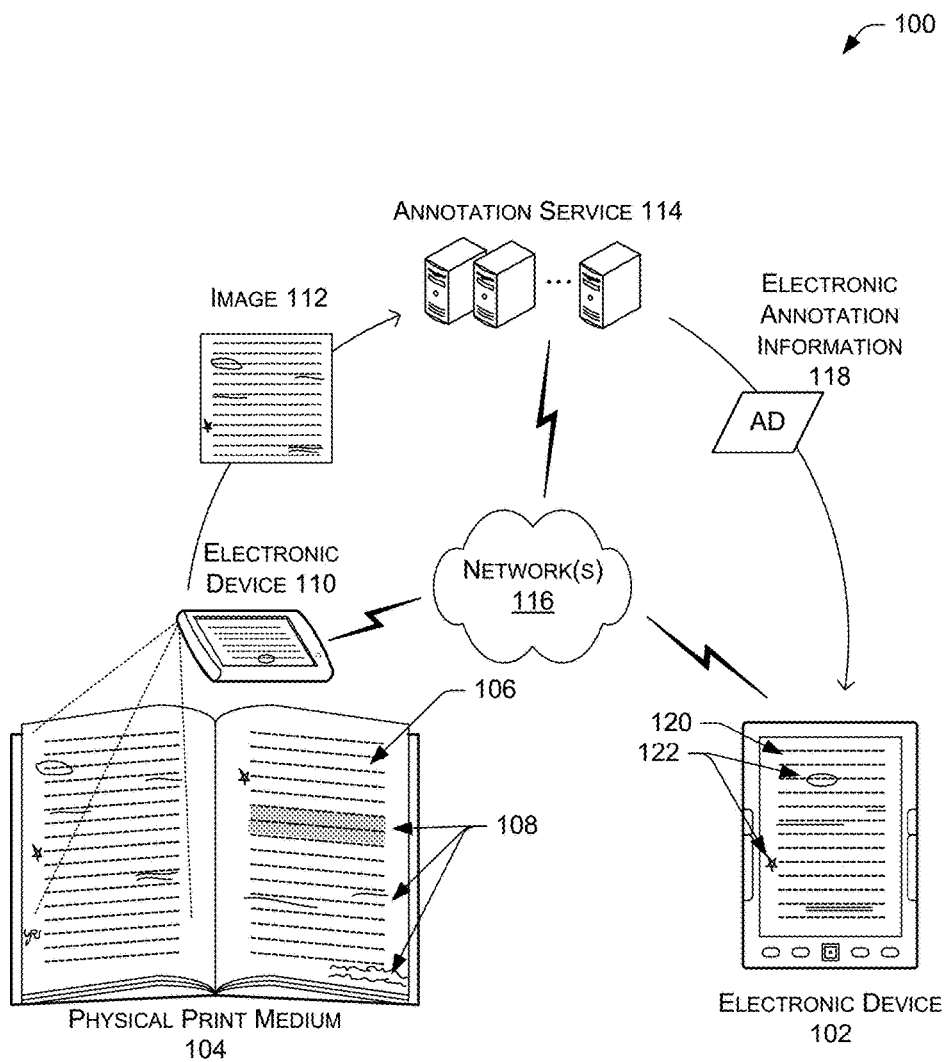
FIG. 1 is a schematic diagram of an illustrative environment configured to perform freeform annotation transcription to create digital annotations.

This disclosure is directed to digitizing freeform annotations present in physical in-print medium for use with corresponding digital medium. For example, a person may make annotations, such as handwritten notes, underlines, highlights, etc., in a physical book and want to share these annotations with other people via a digital version of the annotations configured for use with a corresponding electronic book. The person may desire to digitize the annotations for use in an electronic book ("ebook") version of the book, or possibly to share with other people.

The freeform annotations, which may be handwritten and/or hand-drawn in the physical in-print medium, may be captured by a camera or other image sensor. The image may be analyzed to determine an annotation and associate the annotation with text or objects in the content of the media to create an anchor location for the annotation. The anchor location may be a space adjacent to a word, a margin near a word or paragraph, a letter or group of letters, or another object. The location of the annotation in the print medium may then be mapped to a location in a corresponding digital medium.

The annotation may be converted to a digital annotation. In some instances, the digital annotation may include a vector graphics (VG) image, which may be scaled without compromising quality of the image (e.g., sharpness, etc.) to enable a clean and professional presentation in a digital format. However, the digital annotation may be created as other types of images (e.g., .JPG, etc.). In some instances, the annotation may be converted to a text format as the digitized annotation, for example by converting a detection of a highlight or underline of physical in-print text to digital information mapped to digitized words in an electronic file. Thus, rather than representing the digital annotation as an image file, the digital annotation may be represented by formatting instructions/attributes implemented based on instructions in the digital annotations. In various embodiments, the annotation may be converted, at least partly, to characters, such as ASCII characters through optical character recognition. For example, a bracket may be identified as an ASCII character, and represented as a digital annotation using an ASCII character rather than as an image file.

The annotations may be configured for display in a digital format using different types of graphical user interface (GUI) components. In some instances, the digital version of the annotation may be shown in the GUI by modifying a format of text (e.g., to show underlines, strikeouts, highlights, etc.). To show drawings, handwritten notes, and other annotations, the annotations may be included adjacent to text (in-line with text, over text, etc.), in margins, and/or in other spaces in a view of the text or content of the media. In some embodiments, the annotations may be configured to be revealed in response to a triggering event, such as a user selection. For example, an icon may represent an expandable GUI component that can be selected to reveal an annotation associated with a location in the digital medium. In some instances, slide out interfaces (e.g., slide out windows/features) and other "hiding" GUI components (e.g., expandable windows/features) may be used to selectively reveal digitized annotations, such as in response to a user selection and/or triggering event. In particular, these types of GUI features that selectively hide/reveal annotations can be useful when a digital medium includes less margin space or other "white" space than a counterpart physical in-print medium.

In some embodiments, an editor tool may receive user input to edit annotations imported from physical in-print medium. For example, a physical book may include three different annotations: 1) a highlight, 2) a doodle (i.e., a random drawing), and 3) a handwritten note. The editor tool may receive user input to modify aspects of the highlight (e.g., assign a label, assign a different color, extend/contract highlight, etc.). The editor tool may receive user input to move or delete the doodle. For example, the user may not desire to include the doodle as a digital annotation. The editor tool may receive user input to share or make private some annotations. The editor tool may receive user input to add text to the written note, possibly via a voice annotation recorded by the editor. The editor tool may provide other features described herein.

The techniques and systems described herein may be implemented in a number of ways. Example implementations are provided below with reference to the following figures.

FIG. 1 is a schematic diagram of an illustrative environment 100 to facilitate performance of freeform annotation transcription to create digital annotations. The environment 100 may include an electronic device 102 that can display digital medium, such as digital versions of print medium such as books, newspapers, journals, visual arts (e.g., comics, artistic designs, photographs, etc.) and/or personal documents (e.g., a Microsoft Word® documents, etc.), other types of writings or media. The electronic device 102 may be a dedicated media reader device, such as an "electronic book reader" or "ebook reader", or may be multifunction devices, such as a general use tablet computer, mobile telephone (e.g., smartphone), or any other portable device. However, the electronic device 102 may be any device that can read and display digital medium, including set top boxes, desktop computers, notebook computers, and the like. The environment 100 may include a print medium 104, which may be a physical media item, such as a book. The print medium 104 may include content 106 and freeform annotations 108, which are created by a person, such as a reader of the book. The content 106 may include words, objects (images, data, and/or other printed information), as well as margins (or other whitespace) around the words and objects.

The freeform annotations 108 may include highlights, underlines, shapes, symbols, circling or selection of highlight, handwriting, doodling, drawings, and/or other human created annotations to the content. In some embodiments, the techniques discussed herein may distinguish between intentional (purposeful) annotations and other marks or additions to the content, such as coffee stains, folds and creases, and/or other marks that are not intended to convey information.

In various embodiments, an electronic device 110 may be used to capture an image of all or part of a page of the print medium that includes at least a portion of the content and a portion of the freeform annotation(s). The electronic device 110 may be the same device as the electronic device 102 or may be a different device. For explanation purposes, the following description assumes these are different devices. However, when the devices are the same, similar processes may be performed, which are also described below with reference to FIG. 9. The electronic device 110 may be any electronic device capable of creating an image of the content 106 and annotations 108 of the print medium 104.

The electronic device 110 may send an image 112 to an annotation service 114. The electronic device 110, the annotation service 114, and/or the electronic device 102 may exchange data via one or more networks 116, which may include wired and/or wireless networks. The annotation service 114 may process the image to identify the freeform annotations, determine anchor locations relative to the content 106, and map the anchor locations to corresponding locations in a corresponding digital medium 120 (e.g., ebook version of a physical book, etc.). In some embodiments, the annotation service 114 may receive user input to select annotations, move annotations, delete annotations, modify annotations, add annotations, and/or make other changes or edits to annotations. In various embodiments, some or all of the operations of the annotation service may be performed by the electronic device 102. However, the annotation service 114 may be a distributed service, which may be performed by a coordinated computing of multiple devices, which may be local or remote from one another.

Ultimately, the annotation service 114 may create electronic annotation information 118 that can be used to augment and/or enhance electronic content in the digital medium 120 corresponding to the content 106. The digital medium 120 may be displayed by the electronic device 102. As discussed above, the electronic annotation information 118 may include VG images, text formats (e.g., highlights, underlines, etc.), text, audio, and/or other information. The electronic annotation information 118 may include the anchor points for the annotations and may include a mapping to a location in the digital medium 120. To create the mapping, text or objects in in the image 112 may be compared to information in the digital medium 120 to determine a mapped location that corresponds with a location shown in the image 112. The electronic annotation information 118 may be stored as metadata in association with a digital medium and/or a user account.

The electronic device 102 may read and process the digital medium 120, which may include annotations 122 extracted from and/or derived from the electronic annotation information 118. In some embodiments, the annotations may include annotations derived from the freeform annotations 108 and possibly other annotations created by other users and/or by a user of the device, possibly via manipulation of the electronic device (e.g., creating annotations using electronic inputs, etc.).

Figure 2:
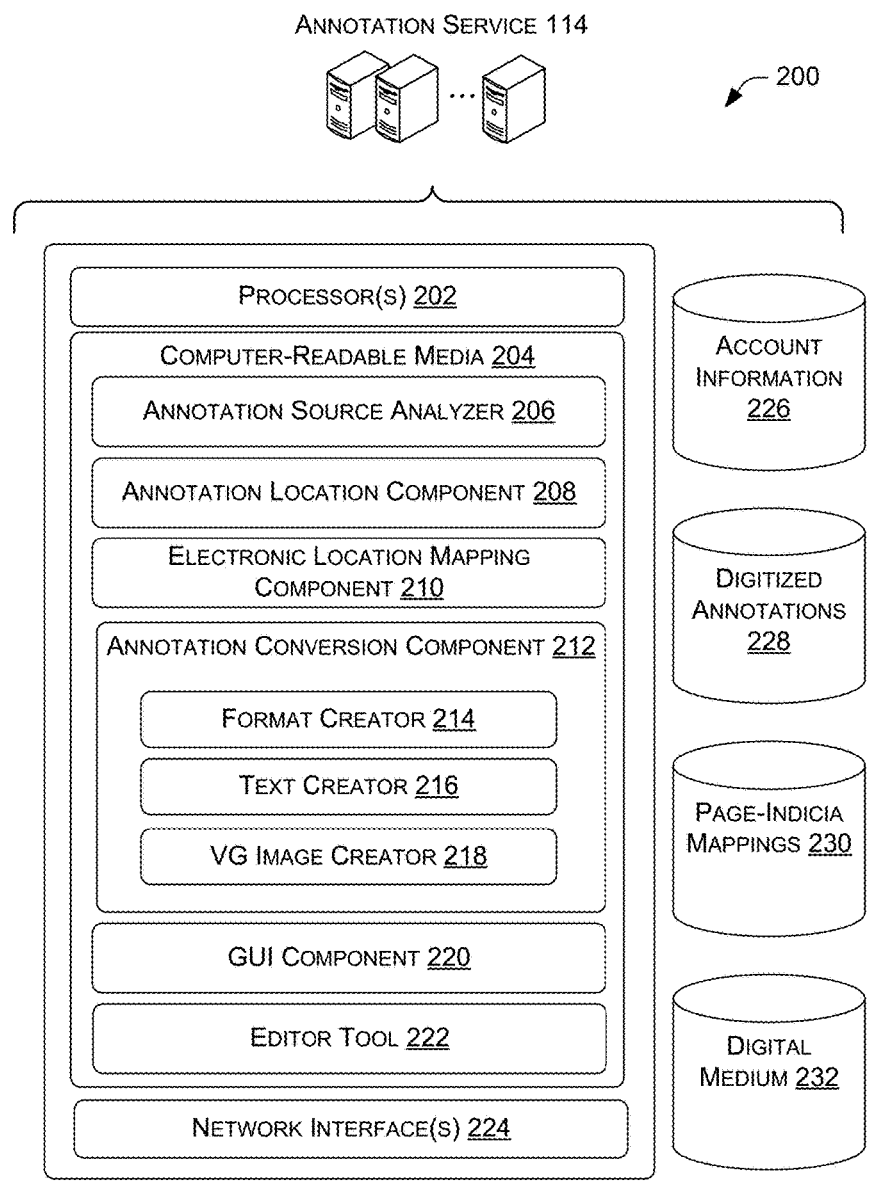
FIG. 2 is a block diagram of a computing architecture to perform freeform annotation transcription to create digital annotations.

FIG. 2 is a block diagram of a computing architecture 200 to perform freeform annotation transcription to create digital annotations. The computing architecture 200 may be implemented in a distributed or non-distributed computing environment. As discussed above, the computing architecture may include the electronic device 102 described with reference to FIG. 1.

The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the annotation service 104.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 204 may store an annotation source analyzer 206, an annotation location component 208, an electronic location mapping component 210, an annotation conversion component 212, a GUI component 220, and an editor tool 222, which are described in turn. The computing architecture 200 may include one or more network interface(s) 224 to facilitate communication with other devices via the network, such as the network(s) 116 shown in FIG. 1. The computing architecture 200 may include or have access to data such as account information 226, digitized annotations 228, page-indicia mappings 230, and/or digital medium 232. The data is described further in the description that follows. The components may be stored together or in a distributed arrangement.

The annotation source analyzer 206 may receive an image of at least a portion of a page of a print medium that includes a freeform annotation created by a person. In some embodiments, the annotation source analyzer 206 may capture or cause capture of the image. The annotation source analyzer 206 may inspect the image and identify one or more annotations. In some embodiments, the annotation source analyzer 206 may create a bounding shape (e.g., a box, freeform shape, or other shape) for each unique annotation and store the annotation, or data associated with the annotation as part of the digitized annotations 228. Annotations may be grouped based on factors such as intersecting lines, proximity of marks, color, line thickness, and/or other attributes. Each annotation may be processed to include a bounding shape (or other shape) that defines a general perimeter of the annotation, and other location information discussed below. The annotation source analyzer 206 may omit extracting the print medium content when extracting the annotation, such as by identify content as typed text and refraining from extracting that text from the image when extracting an identified annotation. Annotations may be identified by edge finding algorithms and/or other graphical selection tools commonly used to identify and extract features from images.

The annotation location component 208 may determine an anchor location for an annotation extracted from the image. The anchor location may be used to locate the annotation in a GUI in a corresponding digital medium that corresponds to the print medium. The anchor location may be on or adjacent to text associated with the freeform annotation or an object associated with the freeform annotation. For example, a freeform annotation may be a highlight over text, where the anchor location may be text that is highlighted. In another example, the freeform annotation may be a handwritten note in a margin next to a sentence of text, where the anchor location may be a margin space adjacent to the sentence of text. The annotation location component 208 may determine an anchor location by identifying closest text and objects to a freeform annotation. In some embodiments, the annotation location component 208 may create a score for each candidate anchor location, where the score may indicate a strength of association. The score may be a measure of a distance, such as an distance between coordinates such as $\{x, y\}$. If the score is less than a threshold score, the editor tool 222 may be used to indicate a low confidence of the anchor location, and may possibly solicit human input. As an example, a freeform annotation may be located in a margin and may have a low correspondence score in association with text due to an intervening annotation being located between the freeform annotation and nearby text. As an example, a college textbook or study bible may include many margin notes, some of which are not adjacent to text and fill up margins in the print medium, and thus may be difficult to anchor to specific text. In various embodiments, the annotation location component 208 may anchor annotations to a centroid of the content in the image, a nearest text or object, and/or other locations (a margin near text, etc.).

The electronic location mapping component 210 may map a location of the content shown in the image to a location in the digital medium. In some embodiments, the electronic location mapping component 210 may map an anchor location of a freeform annotation shown in the image to a location in the digital medium, which may enable placing the freeform annotation as a digital annotation in the digital medium in association with the mapped location in the digital medium. The electronic location mapping component 210 may use optical character recognition to determine the mapping such as by comparing text from optical character recognition (OCR) of the image to text in the digital medium. However, other techniques may be used to map a location in the print medium to a corresponding location in the digital medium. For example, techniques include those described in U.S. Pat. No. 9,049,398 entitled Synchronizing Physical and Electronic Copies of Print medium, which is incorporated in its entirety herein by reference.

The annotation conversion component 212 may include components to convert or transcribe physical freeform annotations to digital annotations. In various embodiments, the annotation conversion component 212 may include a format creator 214, a text creator 216, and/or a vector graphics (VG) image creator 218. The format creator 214 may create formatting information for association with text or an object included in the digital medium. For example, if the freeform annotation includes a highlight, strikethrough, underline, or other format mark, the format creator 214 may create information to replicate the freeform annotation in digital form using a formatting of a text or object, such as by applying a highlight format, a strikethrough format, an underline format, etc. when rendering the corresponding portion of the digital medium. The text creator 216 may identify a corresponding known character that corresponds to a freeform annotation. For example, the freeform annotation may be handwritten words of "yes", which may be recognized using OCR or other algorithms and converted to digital information (e.g., ASCII, etc.) to store the word "yes". In another example, the freeform annotation may be a bracket (e.g., [, (, {, etc.). The VG image creator 218 may create a VG image based on the freeform annotation. The VG image creator 218 may create the VG image based on the area of a bounding box that surrounds the freeform annotation. In some embodiments, other types of images may be created, such as .JPG images and/or other types of image formats. When the VG image creator 218 creates a VG image, scaling information may be stored to enable scaling the VG image with text and/or objects included in the digital medium to cause the displayed VG image to appear as a same scale in the digital medium (compared to content in the digital medium) as in the print medium (compared to content in the print medium).

The GUI component 220 may determine a GUI component to display the digitized annotation. For example, the GUI component 220 may present a digital annotation as text or as a text format based on output by the text creator 216 or the format creator 214, respectively. In some embodiments, the GUI component 220 may determine a GUI feature to use to selectively reveal the digitized annotation, such as an expandable GUI feature, a slide out window, or other feature that can, in response to user input, selectively hide/reveal an annotation. Such features may enable a user to selectively access digitized annotations while also leveraging screen real estate. For example, digital medium may have smaller side margins than print medium, and slide out windows from the margins may be used to extend the margins of digital medium in a virtual sense, such as by causing a window to slide out and show digitized annotations in response to a user selection of a side of a display screen (e.g., a predetermined user gesture) and/or other use user gesture. The GUI component 220 may locate some freeform annotations between text, above/below text, around text, and/or objects.

The editor tool 222 may receive user input to edit freeform annotations during or after creation of the digitized annotations. For example, when an anchor location has a low correspondence score, the editor tool 222 may solicit user input to location the annotation with respect to the digital medium content. The editor tool 222 may enable deleting, moving, or otherwise changing annotations. For example, a freeform annotation may include a doodle drawing, which a user may not desire to include in a digital form. The editor tool 222 may enable removal of non-desired annotations. In some embodiments, the annotation source analyzer 206 may create an annotation that is not intended as an annotation, such as an accidental mark on a page, a crease, a coffee stain, etc., which can be removed by input via the editor tool 222. The editor tool 222 may enable other types of edits to annotations described below.

In some embodiments, the editor tool 222 may enable association of additional information with an annotation and/or creation of information, such as text or audio information as digitized annotations based on information associated with a print medium. For example, the editor tool 222 may include a feature to allow a user to create an audio input in association with a location in a print medium. The editor tool 222 may use speech-to-text algorithms to convert the audio to text. The audio and/or text may supplement the freeform annotations. For example, a user may create a freeform annotation to remind the user of a more detailed or longer thought, which the user may convey via speech or text input via the editor tool 222.

In various embodiments, the digitized annotations may be stored in association with a user profile or other user information and/or identification information, such as in the account information 226. By storing the annotations with accounts, a user may share annotations, access created annotations with different devices, and so forth. The account information 226 may be any one or more repositories storing information associated with users. For example, a user may be represented by an account identifier in the account information 226, and each account identifier may be associated with identifiers of one or more electronic devices of the user or identifiers of user profiles on shared electronic bookmarks or shared electronic device, identifiers of one or more electronic print medium purchased or otherwise acquired by the user, information indicating which of the user's electronic devices have electronic copies of which digital medium, and further information indicating reading locations associated with electronic copies of digital medium. Also, each account identifier may be associated with identifiers of friends or social network contacts of the user. Additionally, the account information 226 may associate an indication of whether the user owning an digital medium also owns a corresponding physical copy of the print medium and may store a current page number in association with that indication.

The digital medium 232 may be any one or more repositories of electronic copies of print medium and may be stored in a local or remote location. The print medium 232 may include a title or document that corresponds to a particular print medium.

In various embodiments, the page-indicia mappings 230 include representative textual and visual indicia associated with each reading location of each digital medium. For example, one reading location may be associated with a unique combination of textual phrases or images extracted from the reading location. Examples of such indicia and their uses are discussed in *Akihiro Miyata and Ko Fujimura*, "Document Area Identification for Extending Books without Marker," *CHI* 2011, May 7-12, 2011, Vancouver, BC, Canada, pgs. 3189-3198 (hereinafter, "Miyata et al."). In Miyata et al., for example, a set of alphanumeric keys read backwards from a text may be taken to represent a page. In addition to the indicia associated with each reading location, the page-indicia mappings may include mappings between reading locations and pages when the reading locations differ from the page numbering used in physical copies of print medium.

The aforementioned components and computing architecture may be used to perform the processes discussed below and to populate the user interfaces described below in accordance with one or more embodiments.

FIGS. 3-6 and 8 are flow diagrams illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
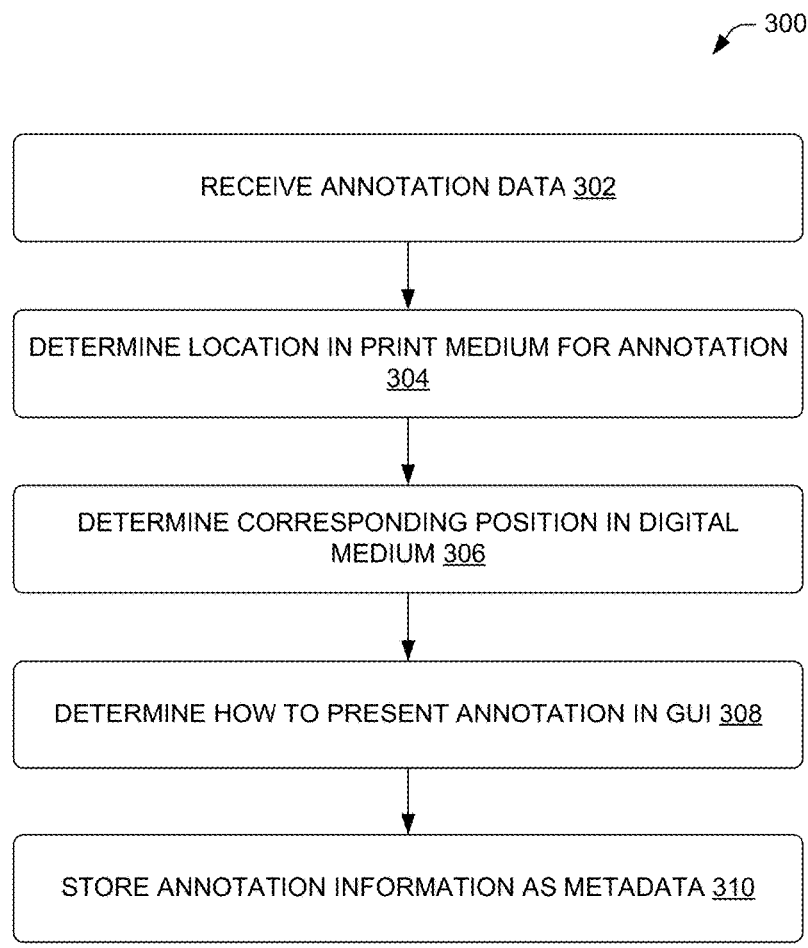
FIG. 3 is a flow diagram of an illustrative process to perform freeform annotation transcription to create digital annotations.

FIG. 3 is a flow diagram of an illustrative process 300 to perform freeform annotation transcription to create digital annotations. The process 300 is described with reference to the environment 100 and the computing architecture 200 may be performed by the annotation service 104. Of course, the process 300 may be performed in other similar and/or different environments and/or by other devices discussed herein.

At 302, the annotation data may be received by the annotation service. For example, the annotation data may be an image captured by a camera, where the image depicts at least a portion of a page of a print medium with freeform annotations. In some embodiments, the image may be captured by a camera of the annotation service, such as when the annotation service 104 is implemented on a reader device, such as the electronic device 102. In various embodiments, the image may be processed to obtain the annotation data, such as unique annotations separate from content in the print medium, via the annotation source analyzer 206.

At 304, a location in the print medium (e.g., physical book, etc.) may be determined for anchoring or association with the freeform annotation. For example, the annotation location component 204 may determine an anchor location for an annotation received at the operation 302. The anchor location may be used to locate the annotation in a GUI in digital medium that corresponds to the print medium. The anchor location may be on or adjacent to text associated with the freeform annotation or an object associated with the freeform annotation. For example, a freeform annotation may be a highlight over text, where the anchor location may be text that is highlighted. In another example, the freeform annotation may be a handwritten note in a margin next to a sentence of text, where the anchor location may be adjacent to the sentence of text.

At 306, a corresponding location in a corresponding digital medium may be determined that corresponds with the location determined at the operation 304. For example, the electronic location mapping component 210 may map a location of the content included in the annotation data from the operation 302 to a location in the digital medium. In some embodiments, the electronic location mapping component 210 may map an anchor location of a freeform annotation shown in the image to a location in the digital medium, which may enable placing the freeform annotation as a digital annotation in the digital medium in association with the mapped location in the digital medium. The electronic location mapping component 210 may use optical character recognition (OCR) to determine the mapping such as by comparing text from OCR of the image to text in the digital medium. However, other techniques may be used to map a location in the print medium to a corresponding location in the digital medium.

At 308, the GUI component 220 or other component(s) may determine how to present the annotation in the GUI. For example, the GUI component 220 may determine a GUI component to display the digitized annotation. The GUI component 220 may present a digital annotation as text or as a text format based on output by the text creator 216 or the format creator 214, respectively. In some embodiments, the GUI component 220 may determine a GUI feature to use to selectively reveal the digitized annotation, such as an expandable GUI feature, a slide out window, or other feature that can, in response to user input, selectively hide/reveal an annotation. Such features may enable a user to selectively access digitized annotations while also leveraging screen real estate.

At 310, the annotation information collected and/or derived from the operations 302-308 may be stored as metadata for use in display with the digital medium. For example, the annotation information may be stored in an annotation file associated with a user account and/or associated with a digital medium (corresponding to the print medium). The annotation information may be processed by a reader device, such as the electronic device 102 to display digital annotations with a digital medium that represent freeform annotations captured from the print medium.

The preceding operations are described in more detail in the description that follows.

Figure 4:
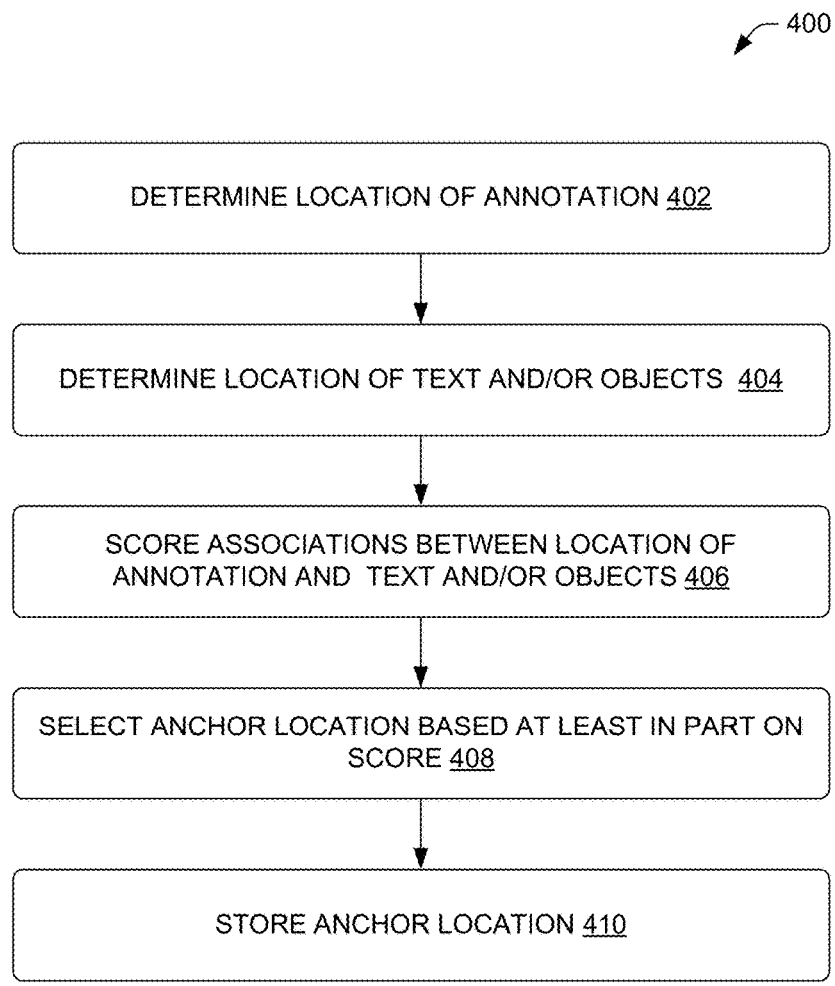
FIG. 4 is a flow diagram of an illustrative process to associate annotations with a location of adjacent text or an adjacent object.

FIG. 4 is a flow diagram of an illustrative process 400 to associate annotations with a location of adjacent text or an adjacent object. The process 400 is described with reference to the environment 100 and the computing architecture 200 may be performed by the annotation service 104. Of course, the process 400 may be performed in other similar and/or different environments and/or by other devices discussed herein.

At 402, a location of an annotation may be determined. The location may be relative to text or objects shown in the print medium. In some embodiments, an annotation may be assigned a coordinate location (e.g., {x, y} location). For example, the annotation location component 208 may determine the location of the annotation relative other items in the print medium. However, other locating techniques may be used, such as intersection of bounding shapes.

At 404, a location of text and/or objects in the print medium may be determined. The location may be relative to the annotation shown in the print medium. In some embodiments, items in the image, such as text and/or objects may be assigned a coordinate location (e.g., {x, y} location). The annotation location component 208 may determine the location of the items in the print medium.

At 406, the annotation location component 208 may score associations between the location of the annotation and the locations of the items (e.g., text, objects). The score may be a distance or may be a different value representative of a strength of association between an annotation and another item. In some embodiments, a type of annotation may be used to determine the association and/or the score. For example, if the annotation is a highlight or underline, the association may be a complete word, rather than part of a word (may extend to full word if only part of the word is highlighted).

At 408, the annotation location component 208 may select an anchor location for the annotation based at least in part on the score. For example, the anchor location may be adjacent to a letter, word, object, margin space, sentence, or other feature in the print medium that may have a corresponding feature in the digital medium for use to place a digitized version of the annotation.

At 410, the annotation location component 208 may store the anchor location, which may be used to map a location of the print medium to a corresponding location in the corresponding digital medium, as discussed below.

Figure 5:
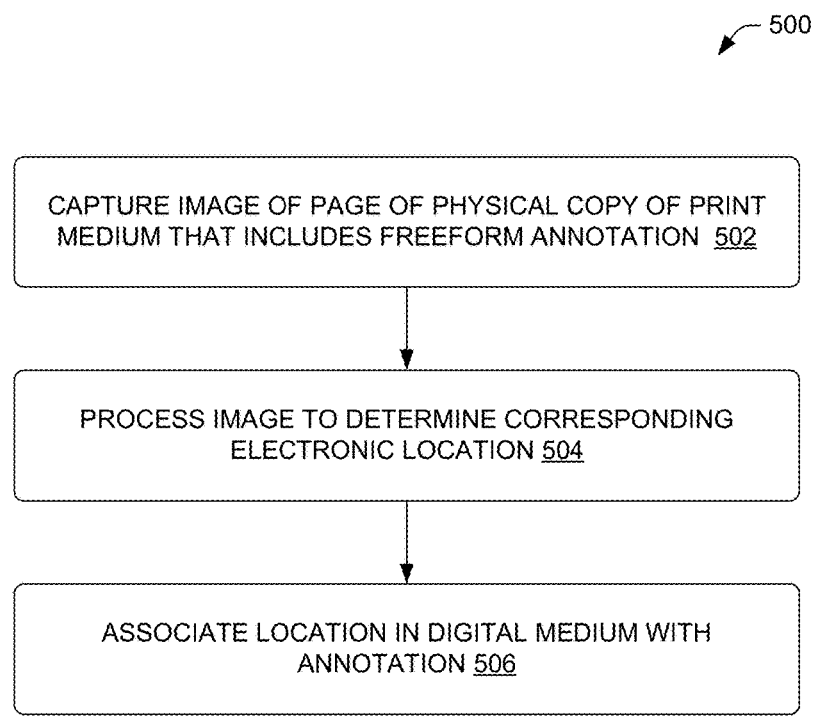
FIG. 5 is a flow diagram of an illustrative process to associate a physical location in print medium with a digital location in digital medium.

FIG. 5 is a flow diagram of an illustrative process 500 to associate a physical location in print medium with a digital location in digital medium. The process 500 is described with reference to the environment 100 and the computing architecture 200 may be performed by the annotation service 104. Of course, the process 500 may be performed in other similar and/or different environments and/or by other devices discussed herein.

For context, the digital medium is typically structured as virtual frames presented on an electronic device, and a user may turn or change from one virtual frame or "page" of electronic content to another. The term "page" as used herein refers to a collection of content that is presented at one time on a display. Thus, "pages" as described herein are not fixed permanently, and may be redefined or repaginated based on variances in display conditions, such as screen size, font type or size, margins, line spacing, resolution, or the like. Accordingly, it may be difficult or impossible for a user reading digital medium on one display device to meaningfully communicate a page cite or annotation to a reader of the same digital medium on another display device, because one or more of the foregoing display conditions may be different. Therefore, locations of print medium are mapped to locations in the corresponding digital medium.

At 502, an image of at least a portion of a print medium may be captured to determine location of the anchor location of an annotation. For example, the anchor location may be determined by capturing an image and then performing the operation 400 described with reference to FIG. 4.

At 504, the electronic location mapping component 210 may map a location of the content shown in the image to a location in the digital medium. In some embodiments, the electronic location mapping component 210 may map an anchor location of a freeform annotation shown in the image to a location in the digital medium, which may enable placing the freeform annotation as a digital annotation in the digital medium in association with the mapped location in the digital medium. The electronic location mapping component 210 may use optical character recognition to determine the mapping such as by comparing text from OCR of the image to text in the digital medium. However, other techniques may be used to map a location in the print medium to a corresponding location in the digital medium.

At 506, the electronic location mapping component 210 may store the determined corresponding location in the digital medium for association with the annotation. In some embodiments, the location may be used to inform the GUI component 220, which may place the annotation with the digital medium, such as in a GUI feature (e.g., an expandable feature, a slider window, in line with text, in a side margin, etc.).

Figure 6:
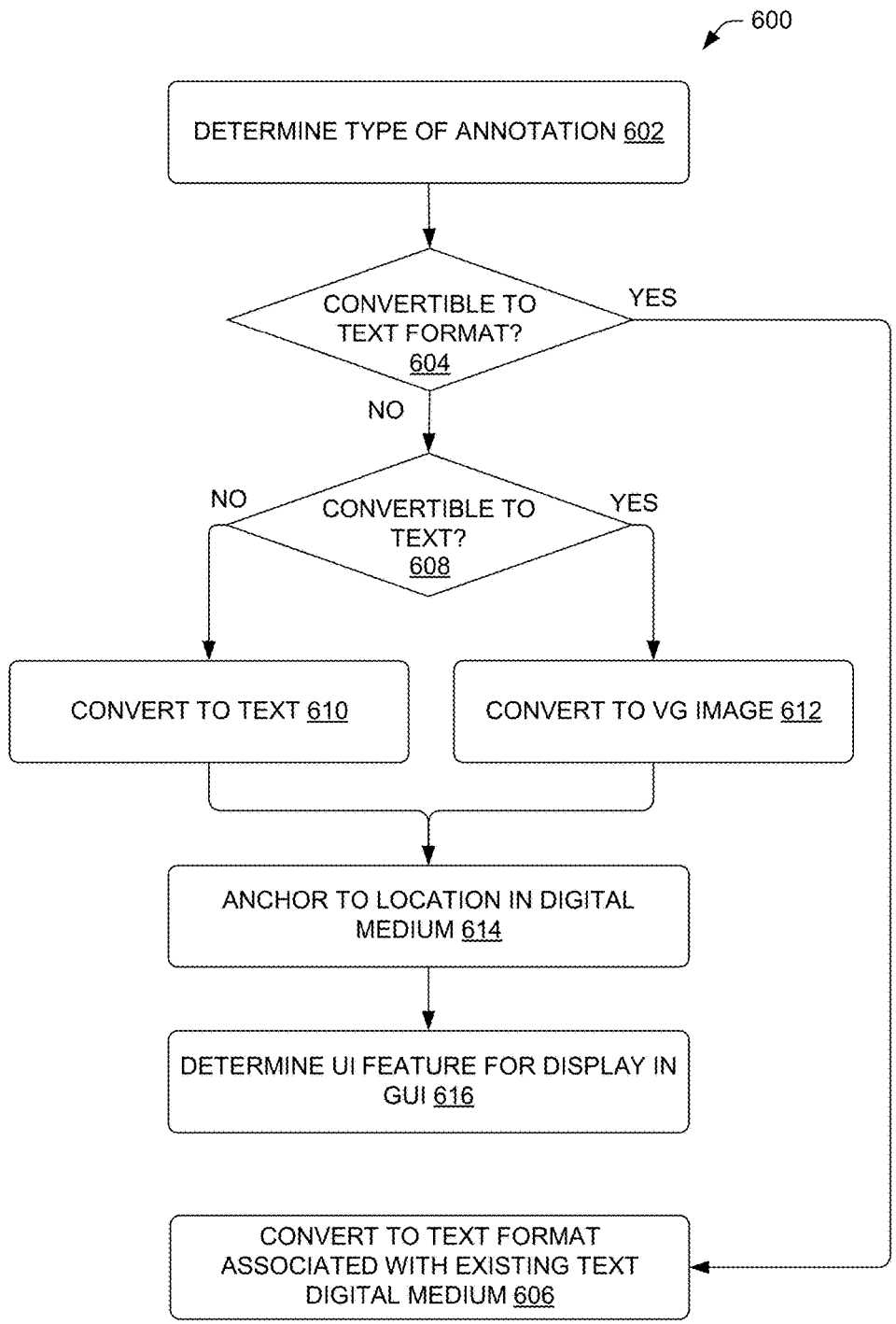
FIG. 6 is a flow diagram of an illustrative process to process an annotation for digitalization of the annotation.

FIG. 6 is a flow diagram of an illustrative process 600 to process an annotation for digitalization of the annotation. The process 600 is described with reference to the environment 100 and the computing architecture 200 may be performed by the annotation service 104. Of course, the process 600 may be performed in other similar and/or different environments and/or by other devices discussed herein.

At 602, the annotation conversion component 212 may determine a type of the freeform annotation. For example, the annotation source analyzer 206 may identify annotations, such as by determining marks on a page that are different from typed text. These marks may be analyzed by image analysis algorithms to classify the mark into different categories, such as freeform annotations that can be converted to text formats (e.g., highlights, underlines, strikeouts, etc.), converted to text, or used to create images such as VG images. In some embodiments, the annotation source analyzer 206 may create a designation for each freeform annotation identified by the annotation source analyzer 206, which may be received by the annotation conversion component 212 and used in the subsequent operations.

At 604, a decision whether to convert the freeform annotation to a text format may be performed. As discussed above, in some instances, the freeform annotation may be designated as convertible to a text format, such as highlights, underlines, strikeouts, and/or other similar text formats. When the freeform annotation is convertible to a text format (following the "yes" route from the decision operation 604), then the process 600 may advance to an operation 606 for further processing.

At 606, the freeform annotation may be converted to a text format by the format creator 214. For example, the type of text format may be determined, including attributes of the text format (e.g., color, line size, etc.). In addition, a location of the text format may be determined, which may be associated with letters, words, and/or groups of words. The format creator 214 may create format data that can be used by a document reader (e.g., the electronic device 102) to format text in a digital medium to reflect the freeform annotation.

When the freeform annotation is not convertible to a text format (following the "no" route from the decision operation 604), then the process 600 may advance to a decision operation 608 for further processing. At 608, a decision whether to convert the freeform annotation to text may be performed. As discussed above, in some instances, the freeform annotation may be designated as convertible to text, such as an ASCII character, symbol, or number. When the freeform annotation is convertible to text (following the "yes" route from the decision operation 608), then the process 600 may advance to an operation 610 for further processing.

At 610, the text creator 216 may convert the freeform annotation to text, such as an ASCII character. For example, the text creator 216 may use image analysis algorithms, such as OCR, to determine a ASCII character associated with a freeform annotation, such as a bracket, letter, number, character, or symbol. The text creator 216 may then store the freeform annotation as the ASCII character. In some embodiments, other image analysis algorithms may be used to detect common shapes, such as brackets, circles, underlines, stars, exclamation points, question marks, and the like.

When the freeform annotation is not convertible to text (following the "no" route from the decision operation 608), then the process 600 may advance to an operation 612 for further processing. At 612, the VG image creator 618 may determine to create a VG image for the freeform annotation. In some embodiments, other types of images may be created, such as .JPG images or images having other types of formats. The VG image creator 618 may determine a scale for the VG image based on other features in the print medium to enable scaling the VG image in a similar way when reproduced in the digital medium. In some embodiments, the VG image creator 618 may create the image based on a bounding box or bounding shape used to designate boundaries of the freeform annotations. In various embodiments, the VG image creator 618 may refrain from including text or other objects and/or marking detected as being part of the printed medium. For example, the VG image creator 218 may designate markings detected as text (e.g., via OCR, etc.), for exclusion from a created image. Thus, the resulting image may not include text that is from the print medium. A similar process may be used to exclude other objects printed in the print medium from being reproduced in image created by the VG image creator 218. As another example, the VG image creator 218 may refrain from including certain marks, such as creases, stains, marks that bleed through a page, and/or other undesirable marks. Some undesirable marks that may penetrate a page may be detected by an occurrence on an adjacent page (e.g., a coffee stain or crease is visible on both sides of a page). Thus, an algorithm may perform a comparison of adjacent pages to detect some undesirable marks, and designate those marks to be excluded from any created annotations.

Following either the operation 610 or the operation 612, the process may advance to an operation 614. At 614, the annotation may be anchored to a location using information created by the annotation location component, such as the anchor location. As discussed above, the anchor location may be on or near text, objects, or white space (e.g., margins) which are in both the print medium and corresponding digital medium.

At 616, the GUI component 220 may determine a UI feature to display the annotation in the digital medium. For example, the annotation may be displayed in line in text, above/below text, in a margin, in a slide out window, in an expandable window, and/or using other UI features that enable selective hiding/revealing of annotations to enable efficient use of screen real estate.

Figure 7:
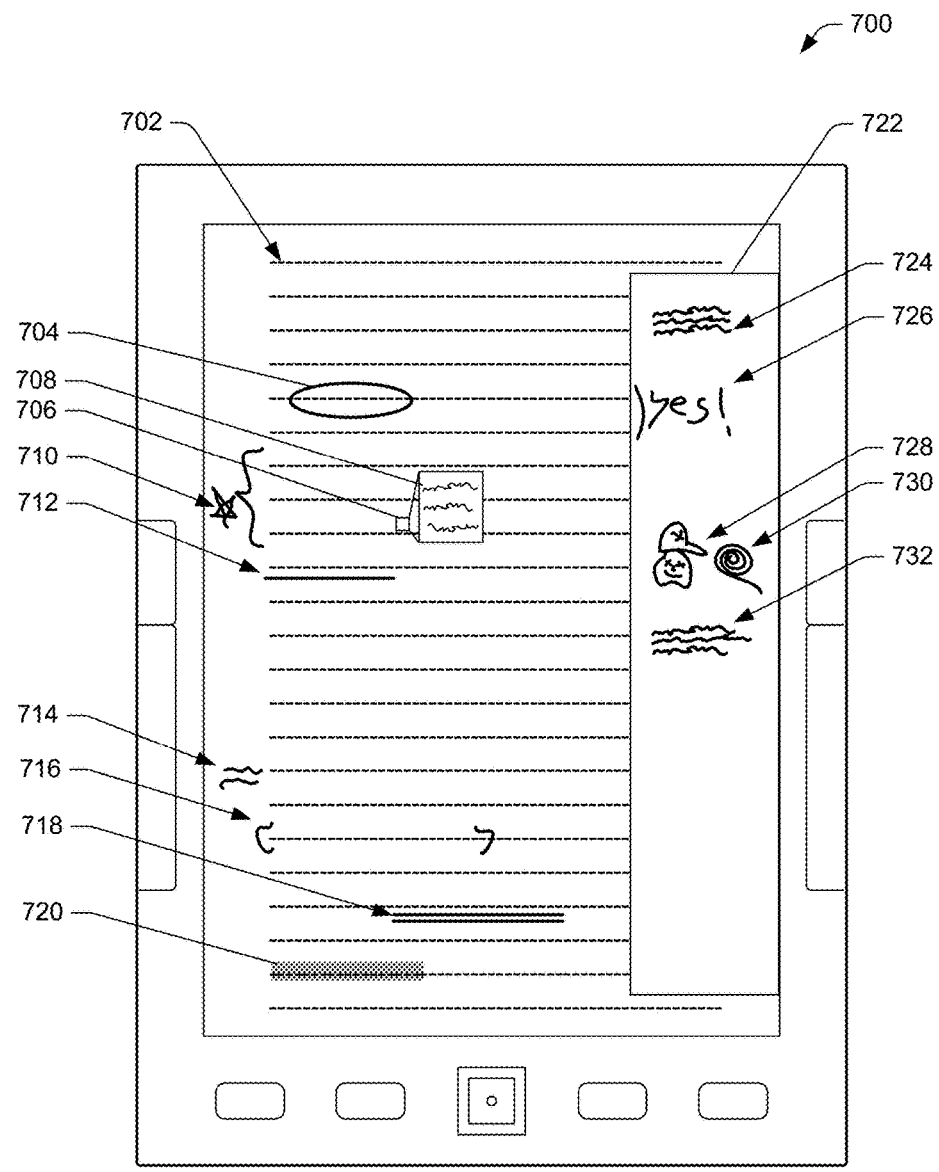
FIG. 7 is an illustrative user interface (UI) that depicts various freeform annotations in electronic form for display by an electronic device.

FIG. 7 is an illustrative user interface (UI) 700 that depicts various freeform annotations in electronic form for display by an electronic device. The UI 700 may include a viewable portion of the digital medium 702, which may be a "page" or reference location. A surrounding annotation 704 may include a mark that at least partially surrounds some text (letter, word, words) or an object (e.g., an image, etc.). The surrounding annotation 704 may be anchored at a centroid of the text or object that is surrounded, or at a different location. An expandable feature 706 may be anchored at a location and may enable selective viewing of a UI feature 708 that includes the annotation, such as a VG image or text created by the text creator 216. A bracket and mark annotation 710 may include a mark and a bracket that indicates an anchor location for the mark. An underline annotation 712 may be anchored by text above the underline annotation. The underline annotation 712 may be implemented as a text format as discussed above. A margin annotation 714 may be anchored in a margin and may be presented in a margin in the digital medium, if available, or by a UI feature such as the expandable feature or a slide out window. A bracket annotation 716 may be converted to ASCII text and associated with text. However, the bracket annotation 716 may be an image, such as a VG image when detection and conversion to ASCII text or other standard marks is not performed. A multiple underline annotation 718 may be anchored by text above the multiple underline annotation. The multiple underline annotation 718 may be implemented as a text format as discussed above. A highlight annotation 720 may be anchored to text to be highlighted. The highlight annotation 720 may be implemented as a text format as discussed above.

A slide out window 722 may provide margin space in a digital rendering of digital medium, which may be used to display digitized annotations. In some embodiments, the slide out window may be selectively revealed and/or hidden to enable a user to read the content and view annotations. In some embodiments, the slide out window may slide from a side of the screen, as shown in FIG. 7 as the right side. Other slide out windows may be used in the other sides or top/bottom of the screen. When a slide out window is revealed, the slide out window may cover text in the digital medium (as shown) or may move the text in the digital medium over to reveal a margin and not cover text. The latter implementation may enable a person to see words associated with an annotation. The slide out window 722 may be revealed by user selection of a side of the screen or other gestures or inputs. The slide out window 722 may include various types of annotations. Examples of these annotations follow. A notation annotation 724 may include a hand-written note. A bracket notation annotation 726 may include a bracket and a note. A first doodle annotation 728 and a second doodle annotation 730 may include drawings stored as separate VG images. In some embodiments, these doodle annotations may be deleted or refrained from being created using the editor tool 222. Another notation annotation 732 may be anchored in the slide out window.

Each annotation shown in the UI 700 may have an associated bounding box or bounding shape. As discussed above, some annotations may be created as images using the bounding box or bounding shapes, while other annotations may be created as ASCII text and/or text formats.

Figure 8:
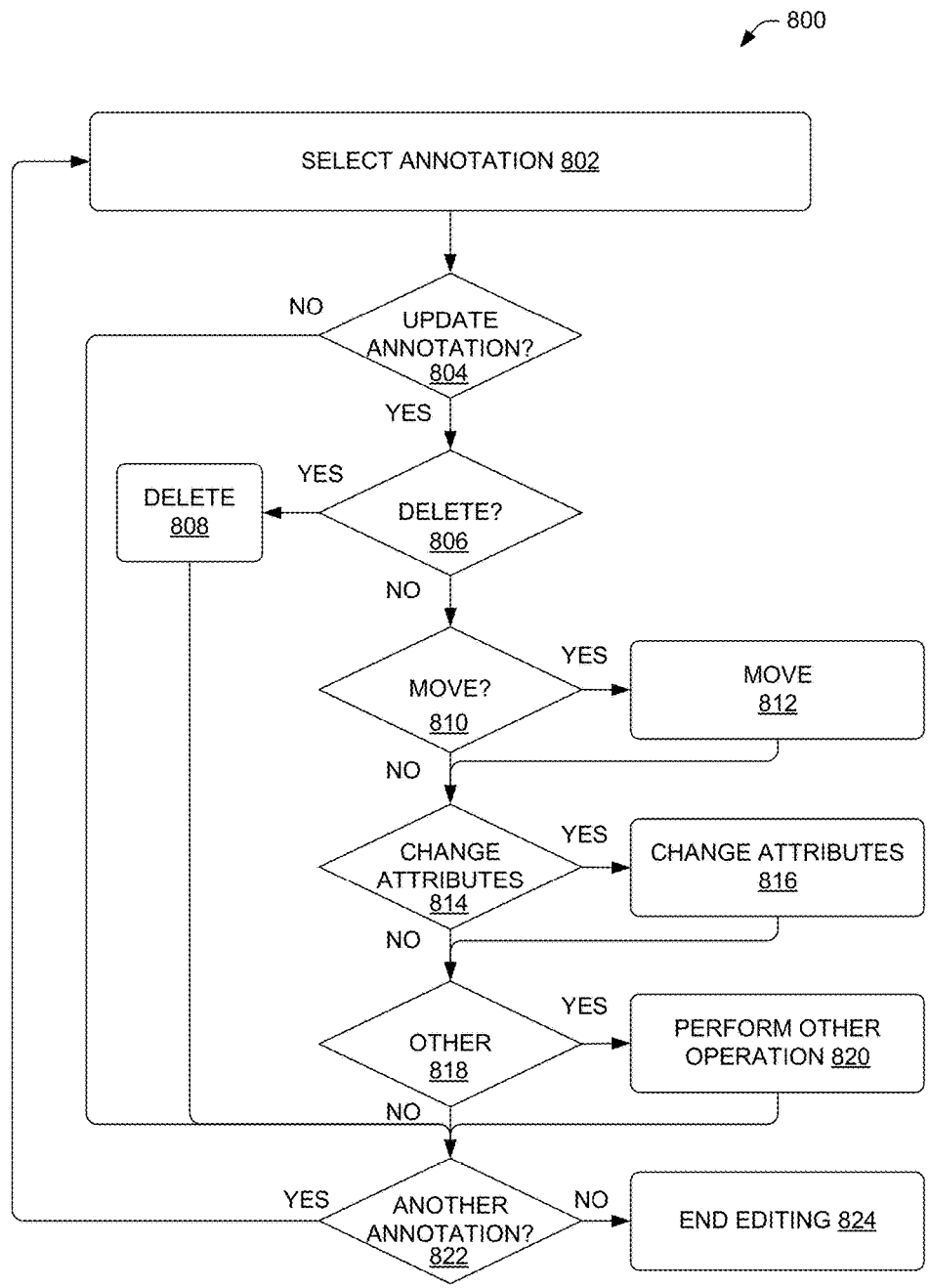
FIG. 8 is a flow diagram of an illustrative process to edit annotations transcribed by an annotation transcription service.

FIG. 8 is a flow diagram of an illustrative process 800 to edit annotations transcribed by an annotation transcription service. The process 800 is described with reference to the environment 100 and the computing architecture 200 may be performed by the annotation service 104 and the editor tool 222. Of course, the process 800 may be performed in other similar and/or different environments and/or by other devices discussed herein.

At 802, an annotation may be selected. For example, the annotation source analyzer 206 may identify an annotation and create a bounding shape around the annotation. The annotation may be assigned an identifier and metadata, including an anchor location (determined by the annotation location component 208), and other information (e.g., author of annotation, date of creation, etc.). Ultimately, a page may have multiple annotations. At 802, an annotation may be selected for editing.

At 804, a decision whether to update the annotation may be performed. An update may include any change to the annotation, including removal of the annotation. When an update to an annotation is to be performed (following the "yes" route from the decision operation 804), then the process 800 may advance to a decision operation 806.

At 806, a decision whether to delete the annotation may be performed. For example, the annotation may be a doodle or an irrelevant notation. In some embodiments, a user may not want to share or digitize a freeform annotation, and thus may desire to delete or omit digitization of the annotation. When the annotation is to be deleted or not digitized (following the "yes" route from the decision operation 806), then the process 800 may advance to an operation 808. At 808, the annotation may be deleted or the annotation service may refrain from digitizing the annotation for inclusion in a digital medium.

When the annotation is not to be deleted, but to be digitized (following the "no" route from the decision operation 806), then the process 800 may advance to a decision operation 810. At 810, a decision whether to move the annotation may be performed. For example, moving the annotation may include moving a location of an anchor associated with the annotation or reassigning the anchor location to different text or a different object (including margin space, etc.). When the annotation is to be moved (following the "yes" route from the decision operation 810), then the process 800 may advance to an operation 812. At 812, edit tool 222 may receive user input to move and/or reassign a location of an annotation, such as via moving or reassigning an anchor location.

When the annotation is not to be moved (following the "no" route from the decision operation 810), or following the operation 812, then the process 800 may advance to a decision operation 814. At 814, a decision whether to change attributes of the annotation may be performed. For example, the annotation may include attributes to enable sharing, which may be designated as shareable or private. A shareable annotation may be shared with a designated group or the public in general. For example, a shared annotation may be shared with acquaintances of the person that created the annotation via links leveraged by the user account information. In some embodiments, the attribute may include visible features that may be changes, such as color, line thickness, and/or other attributes. When the attributes are to be set or changed (following the "yes" route from the decision operation 814), then the process 800 may advance to an operation 816. At 816, the attributes may be set or changed based on user input, such as to change a visible appearance or to designate the annotation as shareable, private or a different designation. In some embodiments, an annotation may be shared with a specific designated person, such as by selection of a person's identifier or other address information.

When the attributes are not to be set or changed (following the "no" route from the decision operation 814), or following the operation 816, then the process 800 may advance to a decision operation 818. At 818, a decision whether to perform other editing operations for the annotation may be performed. For example, the editor tool 222 may enable a user to add content (e.g., text, audio, touchup a drawing, etc.). When other annotation operations are to be performed (following the "yes" route from the decision operation 818), then the process 800 may advance to an operation 820. At 820, the editor tool 222 may be used to perform other annotation operations as discussed above.

When other annotation operations are not to be performed (following the "no" route from the decision operation 818), when an update to an annotation is not to be performed (following the "no" route from the decision operation 804), or following the operation 808 or the operation 820, then the process 800 may advance to a decision operation 822. At 822, a determination whether another annotation is to be selected for editing may be performed. In some embodiments, a low confidence or correlation score may cause the decision operation 822 to follow the "yes" route. When another annotation is to be processed (following the "yes" route from the decision operation 822), then the process 800 may advance to the operation 802 for further processing. When no another annotation is to be processed (following the "no" route from the decision operation 822), then the process 800 may terminate at 824.

Figure 9:
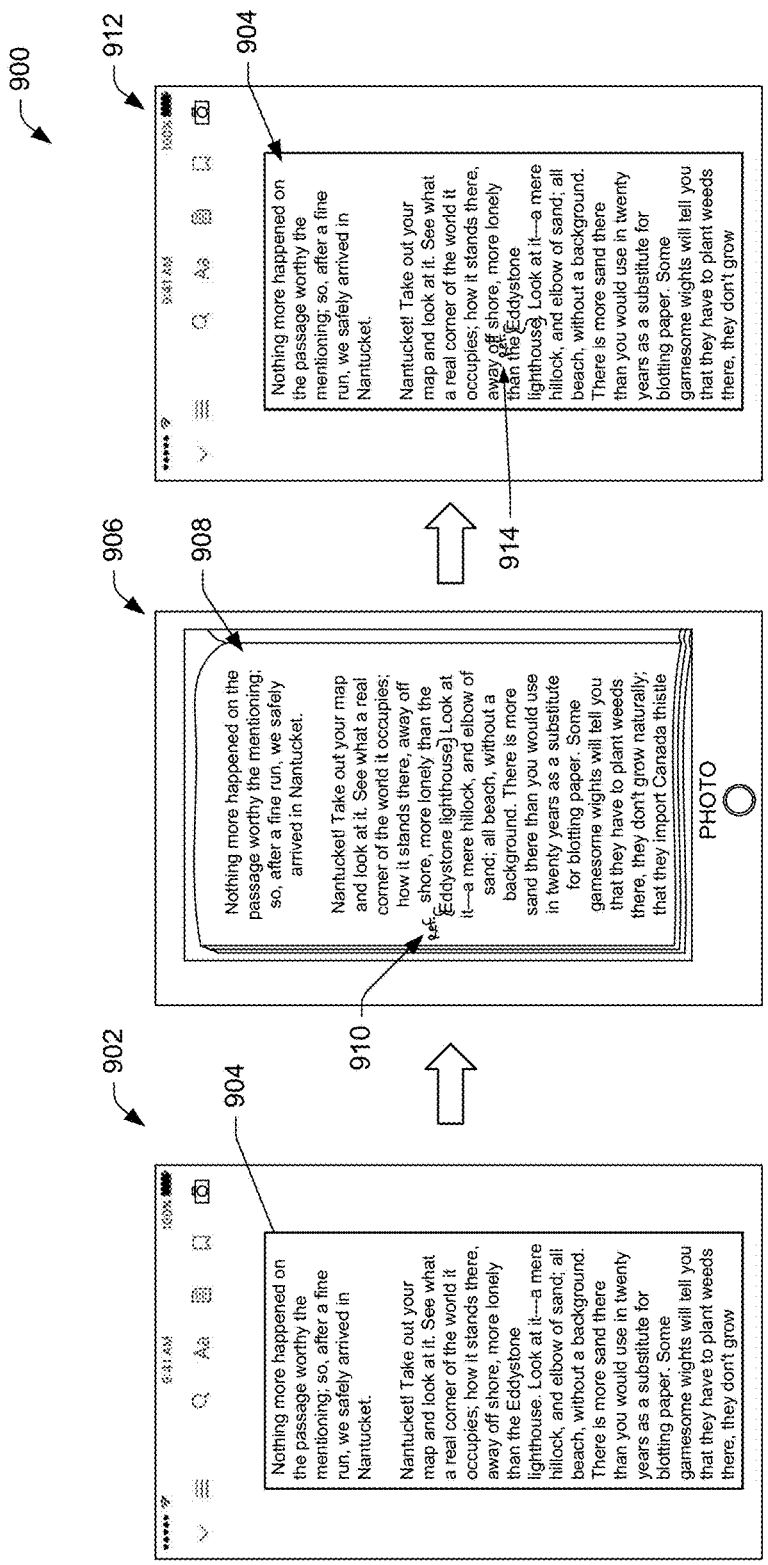
FIG. 9 is an illustrative schematic diagram showing capture and integration of freeform annotations by a device.

FIG. 9 is an illustrative schematic diagram showing illustrative interfaces 900 for capture and integration of freeform annotations by an electronic device. A first interface 902 shows a digital medium 904 without annotations. For example, the digital medium 904 may be shown before importing or digitizing freeform annotations included in a corresponding print medium.

A second interface 906 shows the electronic device operating in a camera mode to capture an image of at least a portion of a page of the corresponding print medium 908 which includes an annotation 910 (e.g., brackets and a notation). The electronic device may include a camera and operate to capture the image of the freeform annotations. However, as discussed above, the image may be captured by other devices and/or processed by other devices, such as distributed computing resources via the annotation service 104.

A third interface 912 shows the digital medium 904 with a digitized annotation 914 created by the processing the image captured via the second interface 906. For example, the image may be processed by the process 300 described with reference to FIG. 3 to create annotation information as metadata, which may then be rendered with corresponding content from the digital medium 904 as digital annotations. The digital annotations may be images, such as VG images that are scaled to appear as a size in the digital content corresponding to a scale of the freeform annotation in the print medium. As shown in in FIG. 9, the digital medium 904 may include words arranged in a location different than a location in the print medium due to digital reflow of text and/or for other reasons. Thus, the anchor location of the freeform annotation is mapped to a corresponding location in the digital medium, which may cause a different layout of the digitized annotation when reproduced electronically, in some instances.

Figure 10:
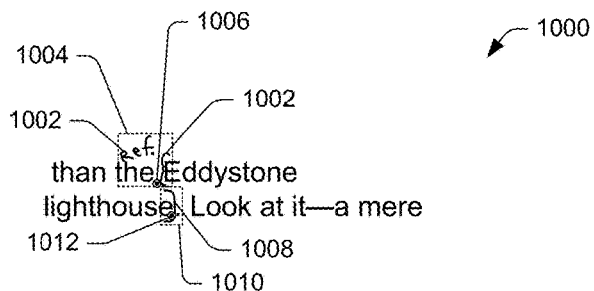
FIG. 10. is a schematic diagram of bounding boxes and anchor points for freeform annotations.

FIG. 10. is a schematic diagram of an illustrative digitized annotation 1000 including bounding boxes and anchor points for freeform annotations. The digitized annotation 1000 may be identified using the annotation source analyzer 206, which may determine a first mark 1002, which may be a first bracket and notation (e.g., "Ref"). The annotation source analyzer 206 may create a first bounding shape 1004 about the first mark 1002 to define the annotation. The annotation location component 208 may determine a first anchor location 1006, which may be adjacent to text, white space between text, or another location. The annotation source analyzer 206 may determine a second mark 1008, which may be a second bracket. The annotation source analyzer 206 may create a second bounding shape 1010 about the second mark 1008 to define the annotation. The annotation location component 208 may determine a second anchor location 1012, which may be adjacent to text, white space between text, or another location. In some embodiments, the first mark 1002 and the second mark 1008 may be associated with one another by the annotation source analyzer 206, for example, for display purposes.

Figure 11:
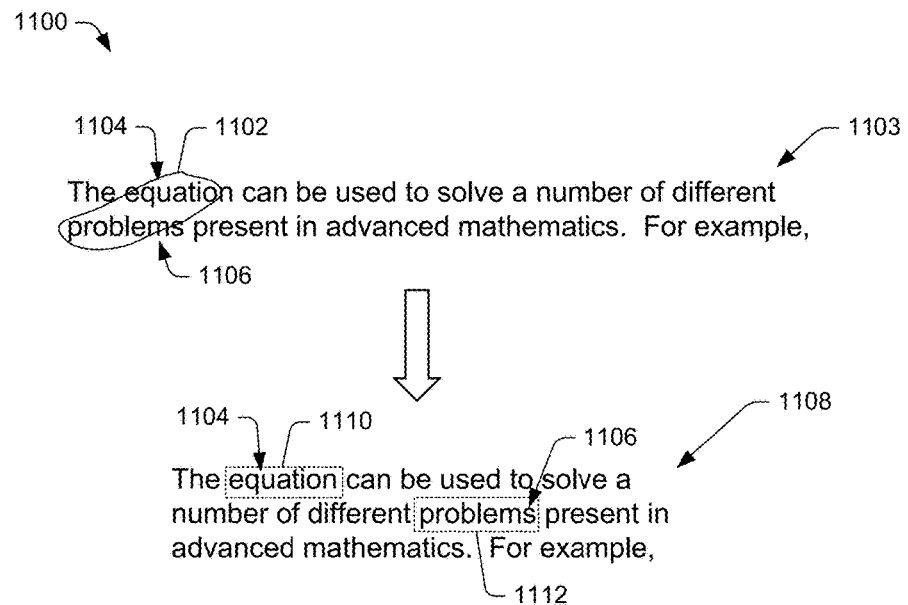
FIG. 11. is an illustrative schematic diagram showing transcription of an ambiguous freeform annotation.

FIG. 11. is an illustrative schematic diagram showing an illustrative transcription 1100 of an ambiguous freeform annotation. A freeform annotation 1102 may include a selection annotation that includes multiple words in different lines of text when captured from a print medium 1103. Since some digital mediums are reflowed on different lines when rendered on an electronic device, a first word 1104 and a second word 1106 may not be located in same relative locations in a digital format 1108. To accommodate reflow, the freeflow annotation may be separately associated with each word within a bounding shape of the free flow annotation. As shown, the digital medium may include multiple digitized annotations 1110, 1112, each associated with the different words 1104, 1106, respectively.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
capturing, by a camera, an image depicting at least a portion of a physical page of a print medium that includes a physical freeform annotation;
locating the physical freeform annotation in the image with a bounding shape that surrounds a perimeter of the physical freeform annotation;
converting the physical freeform annotation within the bounding shape into a vector graphics (VG) image as a digital annotation;
determining, by inspection of the image, a word or object on the physical page that is associated with the physical freeform annotation;
determining a digital location in a digital medium that corresponds to a location of the word or object in the print medium, the digital medium corresponding to the print medium;
associating the VG image with the digital location in the digital medium; and
causing presentation, via a display, of a portion of the digital medium and the VG image at or near the digital location in the digital medium, the VG image scaled based at least in part on a scale of displayed text of the digital medium.

2. The computer-implemented method as recited in claim 1, further comprising transmitting the VG image to a different electronic device as the digital annotation to be rendered with a different copy of the digital medium.

3. The computer-implemented method as recited in claim 1, further comprising:
locating a different physical freeform annotation in the image with a different bounding shape that surrounds a perimeter of the different physical freeform annotation; and converting the different physical freeform annotation into a text format for replication with the digital medium.

4. The computer-implemented method as recited in claim 1, further comprising associating the digital annotation with a user interface element associated with the digital location, the user interface element configured to reveal the VG image in response to a triggering event.

5. The computer-implemented method as recited in claim 1, further comprising receiving an edit to at least one attribute of the digital annotation, the edit to modify at least one of a location of the digital annotation or a color of the digital annotation.

6. A system comprising:
one or more processors; and
memory to store computer-readable instructions that, when executed, cause the one or more processors perform acts including:
receiving an image of a physical freeform annotation included in a portion of a print medium;
determining a word or object in the portion of the print medium that is associated with the physical freeform annotation;
determining a digital location in a digital medium that corresponds to a location of the word or the object in the print medium;
creating a digital annotation to represent the physical freeform annotation in the digital medium;
associating the digital annotation with the digital location in the digital medium; and
storing the digital annotation as metadata associated with the digital medium.

7. The system as recited in claim 6, wherein the acts further comprise creating a bounding shape around one or more handwritten marks that define the physical freeform annotation, the digital annotation including the one or more handwritten marks located within the bounding shape.

8. The system as recited in claim 6, wherein the acts further comprise associating the digital annotation with a non-textual object included in the digital medium, the non-textual object including at least margin space.

9. The system as recited in claim 6, wherein the acts further comprise
determining a score for a relationship between the physical freeform annotation and a candidate text for association with the physical freeform annotation; and
selecting the candidate text for as an anchor location for the physical freeform annotation based at least in part on the score.

10. The system as recited in claim 6, wherein the acts further comprise assigning the digital annotation to be displayed by a user interface element, the user interface element configured to selectively reveal the digital annotation in response to received user input.

11. The system as recited in claim 6, wherein the acts further comprise creating a different image to represent the physical freeform annotation as the digital annotation.

12. The system as recited in claim 6, wherein the physical freeform annotation is at least one of a highlight, strikeout, or underline, and wherein the creating the digital annotation includes creating text format information of at least one of a highlight, strikeout, or underline to format corresponding text in the digital medium.

13. The system as recited in claim 6, wherein the acts further comprise receiving at least one of audio data or text for association with the physical freeform annotation during or after creation of the digital annotation, the digital annotation configured to provide access to the audio data or text.

14. The system as recited in claim 6, wherein the acts further comprise receiving an edit to the digital annotation, the edit to change at least one of an appearance or location of the digital annotation.

15. A computer-implemented method comprising:
receiving an image of a physical freeform annotation included in a portion of a print medium;
determining an anchor location in the portion of the print medium that is associated with the physical freeform annotation;
determining a digital location in a digital medium that corresponds to the anchor location;
creating a digital annotation to represent the physical freeform annotation in a digital medium;
associating the digital annotation with the digital location in the digital medium; and
storing the digital annotation as metadata.

16. The computer-implemented method as recited in claim 15, further comprising:
creating a bounding shape that surrounds a perimeter of the physical freeform annotation; and
converting the physical freeform annotation within the bounding shape into a vector graphics (VG) image as the digital annotation.

17. The computer-implemented method as recited in claim 15, further comprising associating the physical freeform annotation as at least one of a text format or as text, and further comprising:
creating text format information to represent the digital annotation when the physical freeform annotation is associated with the text format; and
creating ASCII text information to represent the digital annotation when the physical freeform annotation is associated with the text.

18. The computer-implemented method as recited in claim 15, wherein content of the print medium includes visual art, and wherein the physical freeform annotation is associated with the visual art.

19. The computer-implemented method as recited in claim 15, further comprising creating a vector graphics (VG) image to represent the physical freeform annotation as the digital annotation.

20. The computer-implemented method as recited in claim 15, further comprising determining a relative distance between the physical freeform annotation and a location of the anchor location, and wherein the determining the anchor location is based on the relative distance between the physical freeform annotation and the location.

* * * * *